United States Patent
Katsu et al.

(10) Patent No.: US 11,874,172 B2
(45) Date of Patent: Jan. 16, 2024

(54) FOURIER TRANSFORM INFRARED SPECTROPHOTOMETER

(71) Applicant: SHIMADZU CORPORATION, Kyoto (JP)

(72) Inventors: Hideaki Katsu, Kyoto (JP); Hiromasa Maruno, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 156 days.

(21) Appl. No.: 17/675,125

(22) Filed: Feb. 18, 2022

(65) Prior Publication Data
US 2022/0276096 A1    Sep. 1, 2022

(30) Foreign Application Priority Data

Feb. 26, 2021 (JP) ................. 2021-029945

(51) Int. Cl.
*G01J 3/453* (2006.01)
*G01N 21/35* (2014.01)
*G01J 3/02* (2006.01)

(52) U.S. Cl.
CPC ............ *G01J 3/4535* (2013.01); *G01J 3/021* (2013.01); *G01J 3/0202* (2013.01); *G01N 21/35* (2013.01)

(58) Field of Classification Search
CPC ........ G01J 3/4535; G01J 3/0202; G01J 3/021; G01J 3/0224; G01J 3/0286; G01N 21/35; G01N 2021/3595; G01N 21/01
See application file for complete search history.

(56) References Cited

U.S. PATENT DOCUMENTS

| | | | | | |
|---|---|---|---|---|---|
| 4,711,573 | A | * | 12/1987 | Wijntjes | G01J 3/4535 356/452 |
| 4,984,891 | A | * | 1/1991 | Miyazaki | G01B 9/02021 356/500 |
| 5,192,197 | A | * | 3/1993 | Culp | F04B 35/04 417/322 |
| 5,978,743 | A | * | 11/1999 | Kiyono | G01D 18/00 702/108 |
| 8,340,523 | B2 | * | 12/2012 | Shen | G02F 1/225 398/85 |
| 9,140,993 | B2 | * | 9/2015 | Shiraishi | G03F 7/70108 |

(Continued)

FOREIGN PATENT DOCUMENTS

JP    H02-253103 A    10/1990

OTHER PUBLICATIONS

Kalamatianos et al., "Active alignment for two-beam interferometers", Review of Scientific Instruments, vol. 77, 013103 (2006).

(Continued)

*Primary Examiner* — David P Porta
*Assistant Examiner* — Gisselle M Gutierrez
(74) *Attorney, Agent, or Firm* — Muir Patent Law, PLLC (57) ABSTRACT

A Fourier transform infrared spectrophotometer includes a main interferometer, a control interferometer, an infrared detector, a control light detector, a waveplate, and a support member. The waveplate is disposed on an optical path of a control light beam and between a fixed mirror or a moving mirror and a beam splitter. The support member supports the waveplate. An outer perimeter of the waveplate includes a supported region supported by the support member and a released region spaced apart from the support member.

8 Claims, 7 Drawing Sheets

(56) References Cited

U.S. PATENT DOCUMENTS

| | | | |
|---|---|---|---|
| 2006/0164643 A1* | 7/2006 | Giakos | G01J 3/433 |
| | | | 356/369 |
| 2008/0315103 A1* | 12/2008 | Yamamoto | G01J 3/45 |
| | | | 250/339.08 |
| 2009/0212769 A1* | 8/2009 | Stoica | G01R 33/032 |
| | | | 324/244.1 |
| 2013/0112667 A1* | 5/2013 | Holmgren | B23K 26/0876 |
| | | | 219/121.6 |
| 2016/0003676 A1* | 1/2016 | Fukuda | G01J 3/108 |
| | | | 250/339.08 |
| 2019/0011357 A1* | 1/2019 | Kato | G01J 3/45 |
| 2019/0271595 A1* | 9/2019 | Chowdhury | G01N 21/636 |
| 2021/0190590 A1* | 6/2021 | Muramatsu | G01B 9/02072 |
| 2022/0260485 A1* | 8/2022 | Katsu | G01J 3/4535 |

OTHER PUBLICATIONS

Lu et al., "A dynamic alignment system for scanning Michelson interferometers", Journal of Physics E: Scientific Instruments, vol. 21, pp. 71-74 (1988).

Pozar et al., "A precise and wide-dynamic-range displacement-measuring homodyne quadrature laser interferometer", Applied Physics B, vol. 105 pp. 575-582 (2011).

Williams, "Mirror Misalignment in Fourier Spectroscopy Using a Michelson Interferometer with Circular Aperture", Applied Optics, vol. 5, No. 6, pp. 1084-1085 (1966).

\* cited by examiner

FOURIER TRANSFORM INFRARED SPECTROPHOTOMETER

BACKGROUND OF THE INVENTION

Field of the Invention

The present disclosure relates to a Fourier transform infrared spectrophotometer.

Description of the Background Art

For example, a Fourier transform infrared spectrophotometer disclosed in Japanese Patent Laying-Open No. 02-253103 includes an infrared light source, a beam splitter, a fixed mirror, and a moving mirror which constitute a two-beam interferometer. A laser beam for determining an orientation of the fixed mirror or the moving mirror is introduced into the two-beam interferometer.

SUMMARY OF THE INVENTION

An object of the present disclosure is to provide a Fourier transform infrared spectrophotometer that can obtain a stable power spectrum with smaller temporal changes.

A Fourier transform infrared spectrophotometer of the present disclosure includes a main interferometer, a control interferometer, an infrared detector, a control light detector, a waveplate, and a support member. The main interferometer includes an infrared light source that emits an infrared light beam, a beam splitter, a fixed mirror, and a moving mirror. The control interferometer includes a control light source that emits a control light beam, the beam splitter, the fixed mirror, and the moving mirror. The infrared detector detects an infrared interference light beam that is generated by the main interferometer and passes through a sample or is reflected by the sample. The control light detector detects a control interference light beam generated by the control interferometer. The waveplate is disposed on an optical path of the control light beam and between the fixed mirror or the moving mirror and the beam splitter. The support member supports the waveplate. An outer perimeter of the waveplate includes a supported region supported by the support member, and a released region spaced apart from the support member.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present disclosure will be described below. The same or corresponding parts have the same reference characters allotted, and description thereof will not be repeated.

A Fourier transform infrared spectrophotometer 1 of an embodiment will be described with reference to FIGS. 1 to 4. Fourier transform infrared spectrophotometer 1 mainly includes a main interferometer 6, a control interferometer 7, an infrared detector 19, a control light detector 34, a mirror angle adjuster 40, a mirror drive 41, a controller 50, a spectrum generator 60, a waveplate 27, and a support member 70. Fourier transform infrared spectrophotometer 1 may further include a collimation lens 22 and a polarization beam splitter 30. Fourier transform infrared spectrophotometer 1 may further include a fixing member 80. Fourier transform infrared spectrophotometer 1 may further include a housing 8.

Figure 1:
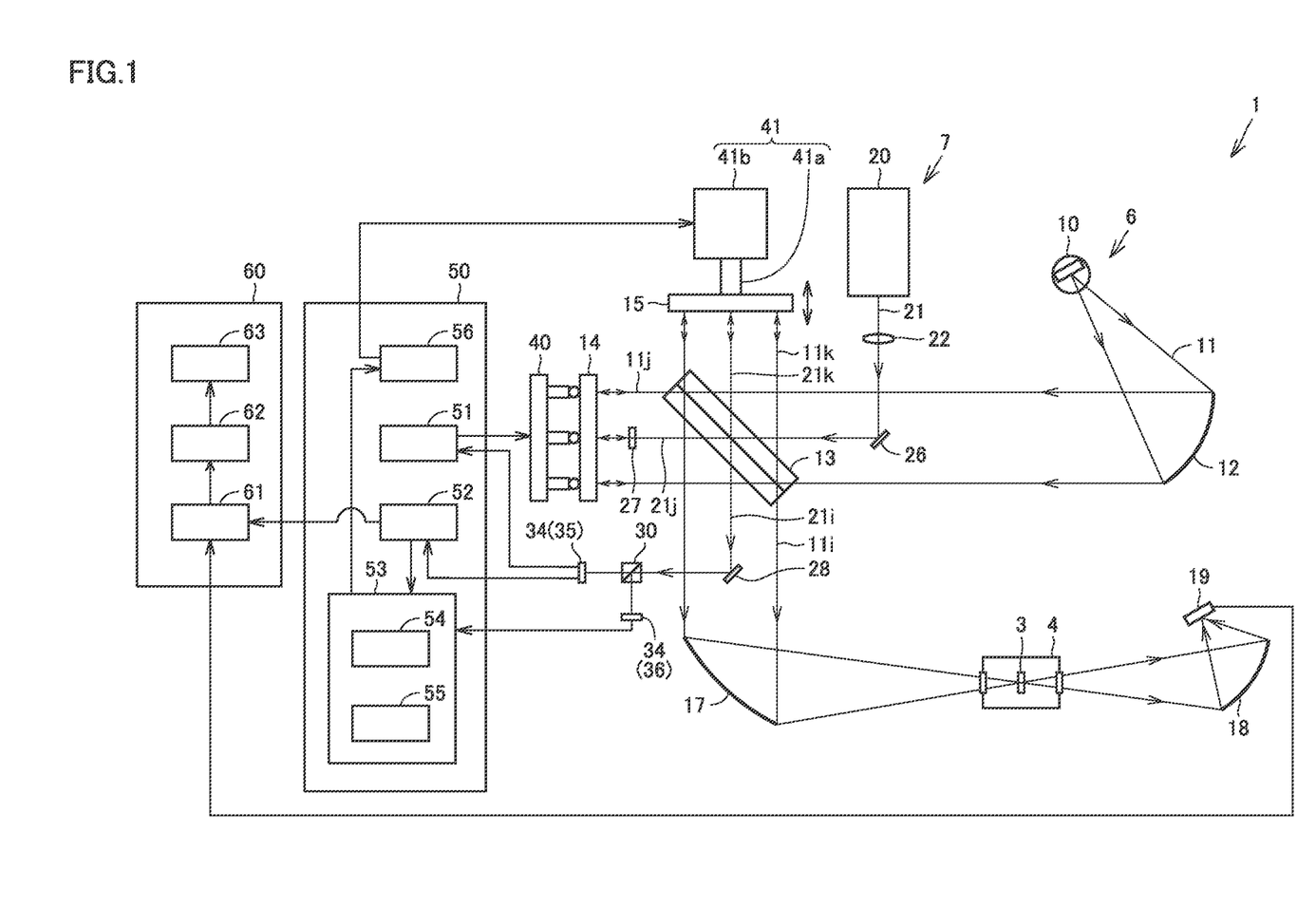
FIG. 1 is a schematic view of a Fourier transform infrared spectrophotometer of an embodiment.

Main interferometer 6 generates an infrared interference light beam 11i for measuring a power spectrum of a sample 3. Referring to FIG. 1, main interferometer 6 includes an infrared light source 10, a beam splitter 13, a fixed mirror 14, and a moving mirror 15. Main interferometer 6 may further include a collimation mirror 12.

Infrared light source 10 emits an infrared light beam 11. Infrared light source 10 is, for example, a ceramic light source. Collimation mirror 12 reflects infrared light beam 11 toward beam splitter 13 and collimates infrared light beam 11.

Beam splitter 13 splits infrared light beam 11 into a first infrared light beam 11j toward fixed mirror 14 and a second infrared light beam 11k toward moving mirror 15. Beam splitter 13 combines first infrared light beam 11j reflected by fixed mirror 14 and second infrared light beam 11k reflected by moving mirror 15. Main interferometer 6 (beam splitter 13) generates infrared interference light beam 11i that is an interference light beam between first infrared light beam 11j and second infrared light beam 11k, and emits infrared interference light beam 11i toward sample 3 and infrared detector 19.

Mirror drive 41 is connected to moving mirror 15. Mirror drive 41 moves moving mirror 15 so as to be close to beam splitter 13 and be distant from beam splitter 13, thereby causing moving mirror 15 to reciprocate. Mirror drive 41 includes, for example, a piston 41a, to which moving mirror 15 is fixed, and a voice coil motor 41b that drives piston 41a.

As moving mirror 15 moves, the orientation of moving mirror 15 (a normal direction of moving mirror 15) may vary. The variations in the orientation of moving mirror 15 change the intensity and the phase of infrared interference light beam 11i to deteriorate an interferogram detected by infrared detector 19. Thus, the orientation of moving mirror 15 or fixed mirror 14 needs to be adjusted to compensate for the variations in the orientation of moving mirror 15. Mirror angle adjuster 40 adjusts the orientation of moving mirror 15 or fixed mirror 14. In the present embodiment, mirror angle adjuster 40 is provided to fixed mirror 14 and adjusts the orientation of fixed mirror 14 (a normal direction of fixed mirror 14). Mirror angle adjuster 40 may be provided to moving mirror 15 and adjust the orientation of moving mirror 15 (the normal direction of moving mirror 15). Mirror angle adjuster 40 is, for example, an actuator including a piezoelectric element. Specifically, the orientation of the mirror can be adjusted by changing the shape of the piezoelectric element.

Infrared interference light beam 11i emitted from main interferometer 6 (beam splitter 13) is reflected and collected by a collector mirror 17 and enters sample 3 disposed in a sample chamber 4. Infrared interference light beam 11i passes through sample 3. Infrared interference light beam 11i may be reflected by sample 3. Infrared interference light beam 11i that passes through sample 3 or is reflected by sample 3 is reflected and collected by a collector mirror 18 and enters infrared detector 19. Infrared detector 19 detects, as an interferogram, infrared interference light beam 11i that is generated by main interferometer 6 and passes through sample 3 or is reflected by sample 3. The interferogram is generated as moving mirror 15 moves. Infrared detector 19 is, for example, a pyroelectric detector or an MCT detector.

Control interferometer 7 generates a control interference light beam 21i for determining the position and the speed of moving mirror 15 and the orientation of fixed mirror 14 or moving mirror 15. Referring to FIG. 1, control interferometer 7 includes a control light source 20, beam splitter 13, fixed mirror 14, and moving mirror 15.

Control light source 20 emits a control light beam 21. Control light source 20 is, for example, a laser light source such as a helium-neon (He—Ne) laser or a semiconductor laser. Control light beam 21 is, for example, a laser beam. Collimation lens 22 is disposed on an optical path of control light beam 21 and between control light source 20 and beam splitter 13. Collimation lens 22 collimates control light beam 21.

A mirror 26 reflects control light beam 21 emitted from collimation lens 22 toward beam splitter 13. Mirror 26 may be disposed in infrared light beam 11. In order to reduce infrared light beam 11 blocked by mirror 26, mirror 26 has a size smaller than the beam diameter of infrared light beam 11. Control light beam 21 travels in parallel with infrared light beam 11 and enters beam splitter 13. An optical axis 21p of control light beam 21 is parallel to an optical axis 11p of infrared light beam 11. Control light beam 21 has a beam diameter smaller than the beam diameter of infrared light beam 11.

Beam splitter 13 splits control light beam 21 into a first control light beam 21j toward fixed mirror 14 and a second control light beam 21k toward moving mirror 15. Beam splitter 13 combines first control light beam 21j reflected by fixed mirror 14 and second control light beam 21k reflected by moving mirror 15. Control interferometer 7 (beam splitter 13) generates control interference light beam 21i that is an interference light beam between first control light beam 21j and second control light beam 21k, and emits control interference light beam 21i toward infrared detector 19.

Waveplate 27 is disposed on the optical path of control light beam 21. Waveplate 27 is disposed between fixed mirror 14 and beam splitter 13. Waveplate 27 may be disposed between moving mirror 15 and beam splitter 13. Waveplate 27 is made of, for example, a transparent material such as synthetic quartz. Waveplate 27 is, for example, a ⅛ wavelength plate (λ/8 plate). When waveplate 27 is the ⅛ wavelength plate, as control light beam 21 with linear polarization passes through waveplate 27 once, a phase of a polarization component of control light beam 21 in a slow axis direction of waveplate 27 lags behind a phase of a polarization component of control light beam 21 in a fast axis direction of waveplate 27 by 45°. Control light beam 21 is reflected by fixed mirror 14 or moving mirror 15. Since control light beam 21 is reflected by fixed mirror 14 or moving mirror 15, control light beam 21 passes through waveplate 27 twice. The phase of the polarization component of control light beam 21 in the slow axis direction of waveplate 27 lags behind the phase of the polarization component of control light beam 21 in the fast axis direction of waveplate 27 by 90°. Thus, control light beam 21 (first control light beam 21j) with linear polarization is converted into control light beam 21 (first control light beam 21j) with circular polarization.

Figure 2:
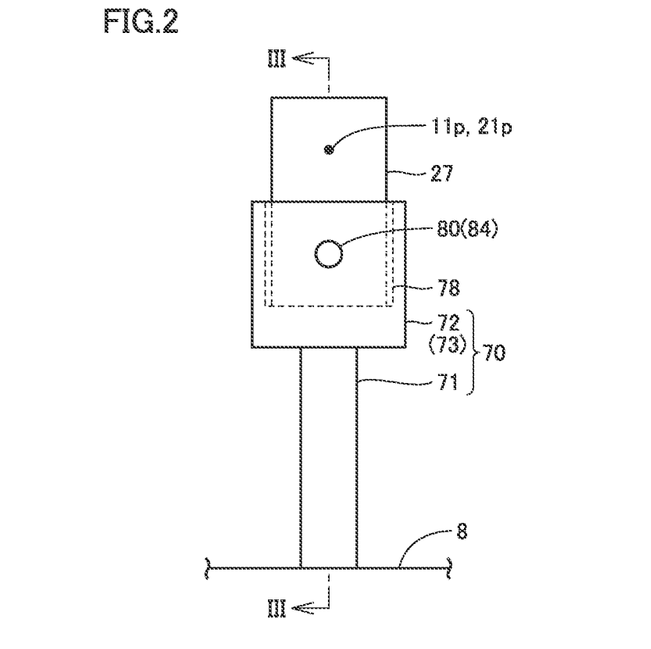
FIG. 2 is a partially enlarged schematic view of the Fourier transform infrared spectrophotometer of the embodiment.
Figure 3:
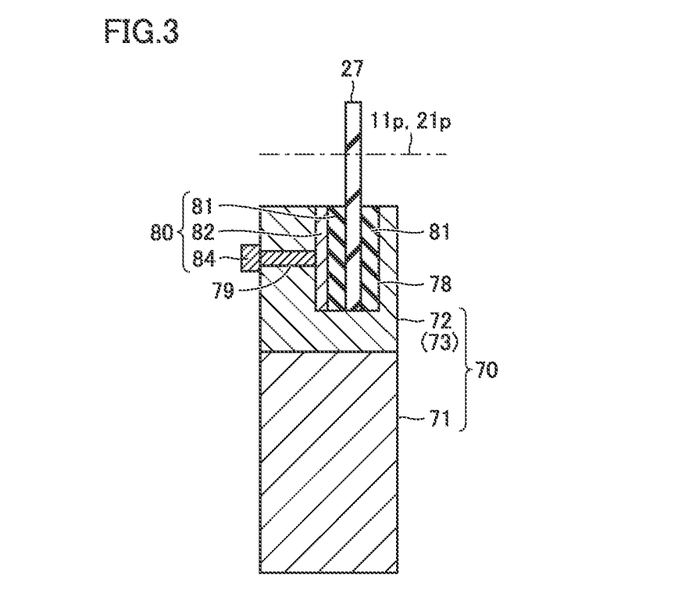
FIG. 3 is a partially enlarged schematic sectional view of the Fourier transform infrared spectrophotometer of the embodiment, which is taken along the sectional line shown in FIG. 2.

Referring to FIGS. 2 and 3, support member 70 supports waveplate 27. The outer perimeter of waveplate 27 includes a supported region supported by support member 70 and a released region spaced apart from support member 70. The released region of the outer perimeter of waveplate 27 is, for example, not less than a third of the length of the outer perimeter of waveplate 27. The released region of the outer perimeter of waveplate 27 may be, for example, not less than a half of the length of the outer perimeter of waveplate 27. Support member 70 includes, for example, a mount 72 and a pillar 71. Support member 70 (mount 72) supports, for example, one side of the outer perimeter of waveplate 27. The other three sides of the outer perimeter of waveplate 27 are spaced apart from support member 70 (mount 72). Support member 70 (mount 72) supports, for example, a lower portion of waveplate 27.

Support member 70 is made of a material different from that of waveplate 27. Support member 70 is made of, for example, a metallic material such as stainless steel or aluminum. Support member 70 has a coefficient of thermal expansion different from the coefficient of thermal expansion of waveplate 27. Mount 72 includes a pedestal 73. Mount 72 (pedestal 73) has a slit 78. Mount 72 (pedestal 73) has a hole 79. Waveplate 27 is inserted into slit 78.

Pillar 71 is connected to mount 72 (pedestal 73). In a plan view from an optical axis 11p direction of infrared light beam 11 (first infrared light beam 11j), pillar 71 has a width smaller than that of mount 72. The width of pillar 71 is, for example, not greater than 50% of the width of mount 72. The width of pillar 71 may be not greater than 40% of the width of mount 72, may be not greater than 30% of the width of mount 72, or may be not greater than 20% of the width of mount 72. In a plan view from the optical axis 11p direction of infrared light beam 11 (first infrared light beam 11j), pillar 71 may have a width smaller than that of waveplate 27. Pillar 71 is attached to housing 8. In the present embodiment, pillar 71 is attached to the bottom wall of housing 8. Pillar 71 may be attached directly to housing 8 or may be attached to housing 8 via another member (not shown).

Fixing member 80 attaches waveplate 27 to support member 70 (e.g., mount 72 (pedestal 73)). Fixing member 80 includes, for example, an elastic spacer 81, a plate 82, and a pressing member 84.

Elastic spacer 81 is made of, for example, a silicone rubber. Elastic spacer 81 is inserted into slit 78 and is disposed between mount 72 (pedestal 73) and waveplate 27. Waveplate 27 may be sandwiched by elastic spacer 81. A first thermal conductivity of the elastic spacer is not greater than 30% of a second thermal conductivity of waveplate 27. The first thermal conductivity of the elastic spacer may be not greater than 20% of the second thermal conductivity of waveplate 27, or may be not greater than 10% of the second thermal conductivity of waveplate 27. The elastic spacer thus reduces thermal conduction between waveplate 27 and support member 70.

Plate 82 is in contact with elastic spacer 81. Plate 82 may be inserted into slit 78. Pressing member 84 presses plate 82 toward elastic spacer 81 and waveplate 27. Pressing member 84 penetrates hole 79. Pressing member 84 is, for example, a screw. Thus, waveplate 27 is fixed to support member 70 with fixing member 80. Pressing member 84 presses waveplate 27 via plate 82. This can prevent local application of a high mechanical stress on waveplate 27. Pressing member 84 presses waveplate 27 via elastic spacer 81. This can prevent local application of a high mechanical stress on waveplate 27.

Control interference light beam 21$i$ emitted from control interferometer 7 (beam splitter 13) travels in parallel with infrared interference light beam 11$i$ and is incident on mirror 28. Mirror 28 may be disposed in infrared interference light beam 11$i$. In order to reduce infrared interference light beam 11$i$ blocked by mirror 28, mirror 28 has a size smaller than the beam diameter of infrared interference light beam 11$i$. Control interference light beam 21$i$ has a beam diameter smaller than the beam diameter of infrared interference light beam 11$i$. Control interference light beam 21$i$ is reflected by mirror 28 and enters control light detector 34. Control light detector 34 detects control interference light beam 21$i$ generated by control interferometer 7. Control light detector 34 is, for example, a photodiode.

Specifically, polarization beam splitter 30 is disposed on an optical path of control interference light beam 21$i$ and between beam splitter 13 and control light detector 34. Control interference light beam 21$i$ reflected by mirror 28 enters polarization beam splitter 30. Polarization beam splitter 30 splits control interference light beam 21$i$ into a first control interference light beam 21$s$ and a second control interference light beam 21$t$. First control interference light beam 21$s$ is, for example, an s-polarized component of control interference light beam 21$i$, and second control interference light beam 21$t$ is a p-polarized component of control interference light beam 21$i$. Control interference light beam 21$i$ is an interference light beam between first control light beam 21$j$ with circular polarization and second control light beam 21$k$ with linear polarization. Thus, a phase difference between first control interference light beam 21$s$ and second control interference light beam 21$t$ is 90°.

Figure 4:
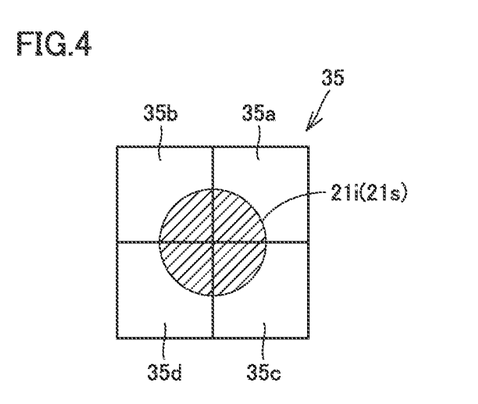
FIG. 4 is a schematic plan view of a first control light detector included in the Fourier transform infrared spectrophotometer of the embodiment.

Control light detector 34 includes a first control light detector 35 and a second control light detector 36. First control light detector 35 detects first control interference light beam 21$s$. Referring to FIG. 4, first control light detector 35 is a multisegmented photodiode (e.g., quadrant photodiode) including a plurality of photodetection elements 35$a$, 35$b$, 35$c$, 35$d$. Photodetection elements 35$a$, 35$b$, 35$c$, 35$d$ may be formed on a single semiconductor substrate. Second control light detector 36 detects second control interference light beam 21$t$. Second control light detector 36 is, for example, a single-element photodiode including a single photodetection element.

Controller 50 is formed of, for example, at least one of a processor, such as a central processing unit (CPU), or an electric circuit. Controller 50 includes a mirror angle adjuster 51, a signal adder 52, a mirror position detector 53, and a mirror speed adjuster 56. Controller 50 may implement the functions of mirror angle adjuster 51, signal adder 52, mirror position detector 53, and mirror speed adjuster 56 as the processor executes a program stored in a storage unit (not shown) of controller 50.

Mirror angle adjuster 51 controls an operation of mirror angle adjuster 40 based on an output of control light detector 34, thereby adjusting the orientation of the mirror (e.g., fixed mirror 14). Specifically, mirror angle adjuster 51 adjusts the orientation of the mirror (e.g., fixed mirror 14) such that the phases of the output signals of photodetection elements 35$a$, 35$b$, 35$c$, 35$d$ included in first control light detector 35 coincide with one another. Thus, variations in the orientation of moving mirror 15, which are caused as moving mirror 15 moves, are compensated for.

Mirror position detector 53 detects the direction of moving of, and the position of, moving mirror 15 based on an output of control light detector 34. Specifically, mirror position detector 53 includes a waveform shaper 54 and an up/down counter 55. Signal adder 52 adds up the output signals of photodetection elements 35$a$, 35$b$, 35$c$, 35$d$ included in first control light detector 35, thereby obtaining a first output signal of first control light detector 35. Mirror position detector 53 receives the first output signal of first control light detector 35 from signal adder 52 and receives a second output signal of second control light detector 36 from second control light detector 36. Waveform shaper 54 converts the first output signal of first control light detector 35 into a first pulse train signal. Waveform shaper 54 converts the second output signal of second control light detector 36 into a second pulse train signal.

Up/down counter 55 receives the first pulse train signal and the second pulse train signal from waveform shaper 54. Up/down counter 55 specifies the direction of moving of moving mirror 15 from the phase relationship between a first phase of the first pulse train signal and a second phase of the second pulse train signal. For example, when the first phase of the first pulse train signal is ahead of the second phase of the second pulse train signal by 90°, up/down counter 55 specifies the direction away from beam splitter 13 as the direction of moving of moving mirror 15. When the first phase of the first pulse train signal is behind the second phase of the second pulse train signal by 90°, up/down counter 55 specifies the direction away from beam splitter 13 as the direction of moving of moving mirror 15. The pulse number of pulse train signals which is counted by up/down counter 55 depends on the position of moving mirror 15. Mirror position detector 53 specifies the position of moving mirror 15 from the direction of moving of moving mirror 15 and the pulse number of pulse train signals which are obtained by up/down counter 55.

Mirror speed adjuster 56 controls mirror drive 41 to adjust the speed of moving of moving mirror 15. Specifically, mirror speed adjuster 56 controls mirror drive 41 such that the constant frequency of the first pulse train signal, obtained by mirror position detector 53, or the first output signal of first control light detector 35, obtained by signal adder 52, becomes constant. In this manner, mirror speed adjuster 56 moves moving mirror 15 at a constant speed.

Spectrum generator 60 is formed of, for example, at least one of a processor, such as a central processing unit (CPU), or an electric circuit. Controller 50 and spectrum generator 60 may be composed of one computer. Spectrum generator 60 includes a sample-and-hold unit 61, an analog-digital converter 62, and a Fourier transform operation unit 63. For example, spectrum generator 60 may implement the functions of sample-and-hold unit 61, analog-digital converter 62, and Fourier transform operation unit 63 as the processor executes a program stored in the storage unit (not shown) of controller 50.

Spectrum generator 60 generates a power spectrum of sample 3 from the interferogram detected by infrared detector 19. Specifically, the first pulse train signal or the second pulse train signal obtained by mirror position detector 53 is input to sample-and-hold unit 61. Sample-and-hold unit 61 samples the interferogram detected by infrared detector 19, at a timing defined by the first pulse train signal or the second pulse train signal. Analog-digital converter 62 digitally converts the sampled interferogram. Fourier transform operation unit 63 performs Fourier transform on the digitally converted interferogram. Thus, the power spectrum of sample 3 is obtained.

Housing 8 accommodates an optical system of Fourier transform infrared spectrophotometer 1, which includes main interferometer 6, control interferometer 7, infrared detector 19, and control light detector 34.

[Operation of Fourier Transform Infrared Spectrophotometer 1]

Description will be given of an operation of Fourier transform infrared spectrophotometer 1 in determination of the position and the speed of moving mirror 15 and the orientation of fixed mirror 14 or moving mirror 15. While moving mirror 15 is moving, the position and the speed of moving mirror 15 and the orientation of fixed mirror 14 or moving mirror 15 are monitored in real time.

Polarization beam splitter 30 splits control interference light beam 21*i* emitted from control interferometer 7 into first control interference light beam 21*s* and second control interference light beam 21*t*. First control light detector 35 detects first control interference light beam 21*s*. Second control light detector 36 detects second control interference light beam 21*t*. Mirror angle adjuster 51 adjusts, for example, the orientation of the mirror (e.g., moving mirror 15) such that the phases of the output signals of photodetection elements 35*a*, 35*b*, 35*c*, 35*d* included in first control light detector 35 coincide with one another.

Signal adder 52 adds up the output signals of photodetection elements 35*a*, 35*b*, 35*c*, 35*d* included in first control light detector 35, thereby obtaining the first output signal of first control light detector 35. Mirror position detector 53 receives the first output signal of first control light detector 35 from signal adder 52 and receives the second output signal of second control light detector 36 from second control light detector 36. Waveform shaper 54 converts the first output signal of first control light detector 35 into the first pulse train signal. Waveform shaper 54 converts the second output signal of second control light detector 36 into the second pulse train signal.

Up/down counter 55 receives the first pulse train signal and the second pulse train signal from waveform shaper 54. Up/down counter 55 specifies the direction of moving of moving mirror 15 from the phase relationship between the first phase of the first pulse train signal and the second phase of the second pulse train signal. Mirror position detector 53 also specifies the position of moving mirror 15 from the direction of moving of moving mirror 15 and the pulse number of pulse train signals which are obtained by up/down counter 55.

Mirror speed adjuster 56 controls mirror drive 41 such that the constant frequency of the first pulse train signal, obtained by mirror position detector 53, or the output signal of first control light detector 35, obtained by signal adder 52, becomes constant. Thus, mirror speed adjuster 56 moves moving mirror 15 at a constant speed.

Description will be given of an operation of Fourier transform infrared spectrophotometer 1 in measurement of a power spectrum of sample 3.

Infrared interference light beam 11*i* emitted from main interferometer 6 passes through sample 3 or is reflected by sample 3. Infrared detector 19 detects, as an interferogram, infrared interference light beam 11*i* that passes through sample 3 or is reflected by sample 3. The interferogram is generated as moving mirror 15 moves. Spectrum generator 60 generates a power spectrum of sample 3 from the interferogram detected by infrared detector 19.

Specifically, the first pulse train signal or the second pulse train signal obtained by mirror position detector 53 is input to sample-and-hold unit 61. Sample-and-hold unit 61 samples the interferogram detected by infrared detector 19, at a timing defined by the first pulse train signal or the second pulse train signal. Analog-digital converter 62 digitally converts the sampled interferogram. Fourier transform operation unit 63 performs Fourier transform on the digitally converted interferogram. Thus, the power spectrum of sample 3 is obtained.

[Variations]

Figure 5:
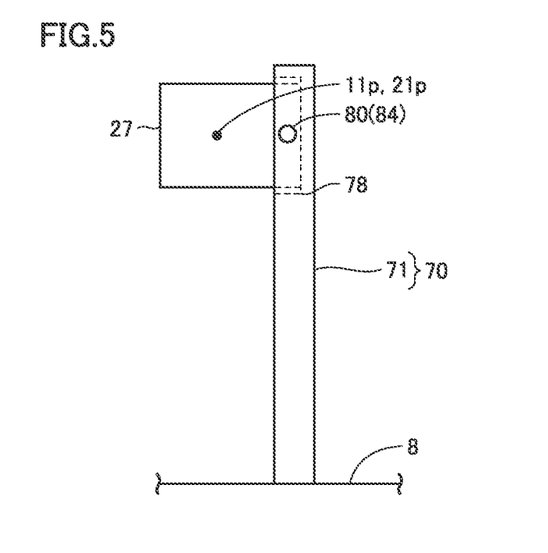
FIG. 5 is a partially enlarged schematic view of a Fourier transform infrared spectrophotometer of a first variation of the embodiment.

Referring to FIG. 5, support member 70 includes pillar 71 but does not include mount 72 (see FIG. 2) in Fourier transform infrared spectrophotometer 1 of a first variation of the present embodiment. Slit 78 is provided in pillar 71. Waveplate 27 is attached to pillar 71 with fixing member 80. Support member 70 (pillar 71) supports, for example, one side of the outer perimeter of waveplate 27. The other three sides of the outer perimeter of waveplate 27 are spaced apart from support member 70 (pillar 71). Support member 70 (pillar 71) supports, for example, a lateral edge of waveplate 27. Pressing member 84 presses the lateral edge of waveplate 27.

Figure 6:
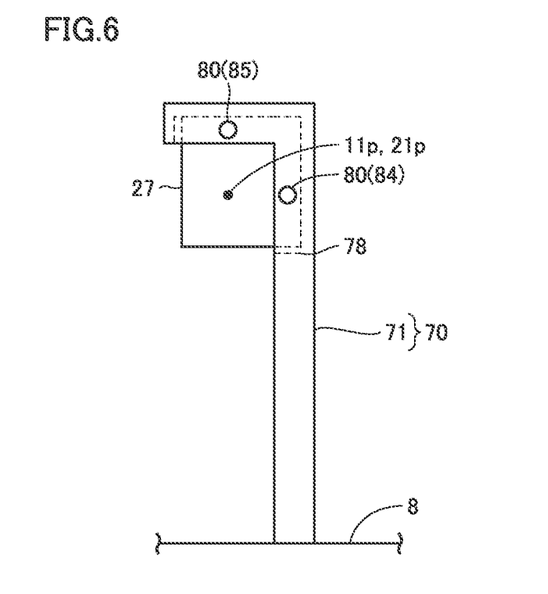
FIG. 6 is a partially enlarged schematic view of a Fourier transform infrared spectrophotometer of a second variation of the embodiment.

Referring to FIG. 6, in Fourier transform infrared spectrophotometer 1 of a second variation of the present embodiment, support member 70 is configured similarly to support member 70 of the first variation of the present embodiment (see FIG. 5), and is different from support member 70 of the first variation of the present embodiment in that pillar 71 has an L-shape. Fixing member 80 further includes a pressing member 85 such as a screw. Waveplate 27 is attached to pillar 71 with fixing member 80. Support member 70 (pillar 71) supports, for example, two sides of the outer perimeter of waveplate 27. The other two sides of the outer perimeter of waveplate 27 are spaced apart from support member 70 (pillar 71). Support member 70 (pillar 71) supports, for example, the lateral edge of waveplate 27 and the upper edge of waveplate 27. Pressing member 84 presses the lateral edge of waveplate 27. Pressing member 85 presses the upper edge of waveplate 27.

Figure 7:
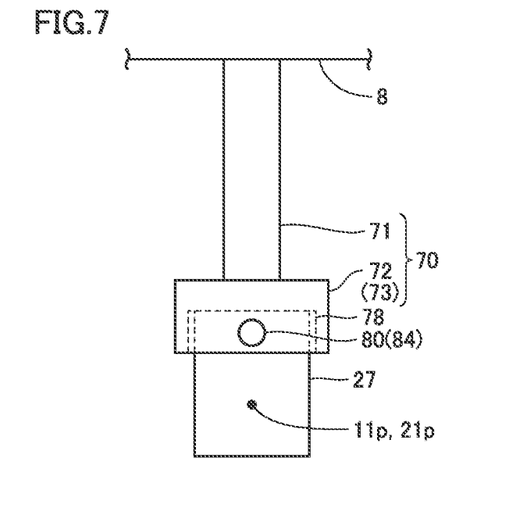
FIG. 7 is a partially enlarged schematic view of a Fourier transform infrared spectrophotometer of a third variation of the embodiment.

Referring to FIG. 7, in Fourier transform infrared spectrophotometer 1 of a third variation of the present embodiment, waveplate 27 is suspended from the top wall of housing 8. Specifically, pillar 71 is attached to the top wall of housing 8. Waveplate 27 is attached to mount 72 (pedestal 73) with fixing member 80. Support member 70 (mount 72)

supports, for example, one side of the outer perimeter of waveplate 27. The other three sides of the outer perimeter of waveplate 27 are spaced apart from support member 70 (mount 72). Support member 70 (mount 72) supports, for example, the upper edge of waveplate 27. Pressing member 84 presses the upper edge of waveplate 27.

Second control light detector 36 may also be a multisegmented photodiode including a plurality of photodetection elements. When second control light detector 36 is the multisegmented photodiode, signal adder 52 adds up the output signals of the plurality of photodetection elements included in second control light detector 36, thereby obtaining a second output signal of second control light detector 36. Mirror position detector 53 receives a second output signal of second control light detector 36 from signal adder 52. Waveplate 27 is not limited to a ⅛ wavelength plate (λ/8 plate) and may be a quarter wavelength plate (λ/4 plate) or a half-wavelength plate (λ/2 plate).

Functions of the Present Embodiment

Figure 9:
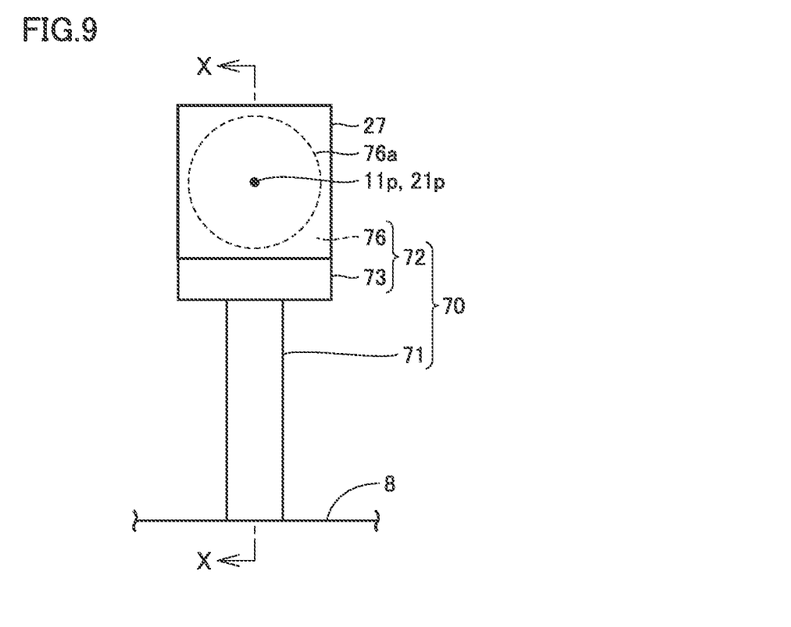
FIG. 9 is a partially enlarged schematic view of a Fourier transform infrared spectrophotometer of a comparative example.
Figure 10:
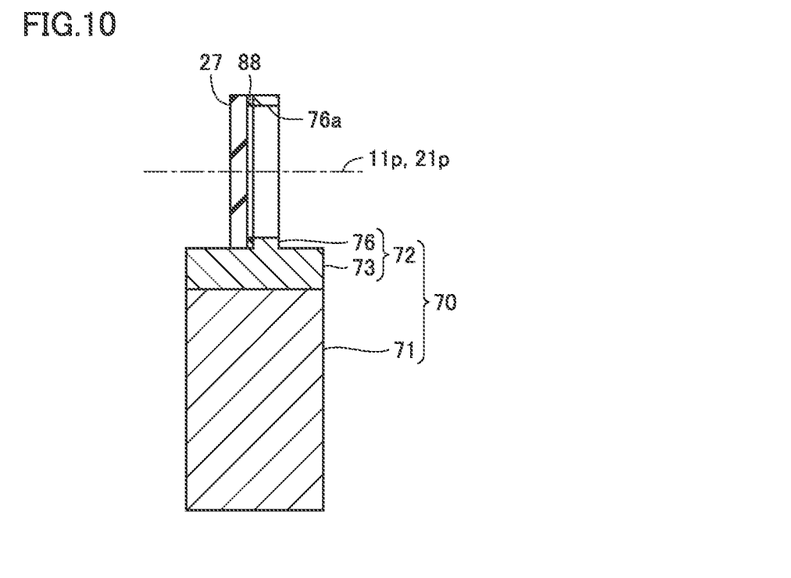
FIG. 10 is a partially enlarged schematic sectional view of the Fourier transform infrared spectrophotometer of the comparative example, which is taken along the sectional line X-X shown in FIG. 9.

The functions of Fourier transform infrared spectrophotometer 1 according to an example of the present embodiment, shown in FIGS. 1 to 4, will be described in comparison with those of a Fourier transform infrared spectrophotometer of a comparative example. The Fourier transform infrared spectrophotometer of the comparative example includes a configuration similar to that of Fourier transform infrared spectrophotometer 1 of the example, and is different in the following respects. Referring to FIGS. 9 and 10, in the comparative example, mount 72 includes pedestal 73 and a frame 76 provided on pedestal 73. Frame 76 has an opening 76a. The entire outer perimeter of waveplate 27 is attached to mount 72 (frame 76) with an adhesive 88 such as an ultraviolet curable adhesive. In other words, the entire outer perimeter of waveplate 27 is restrained by support member 70 (mount 72).

Figure 8:
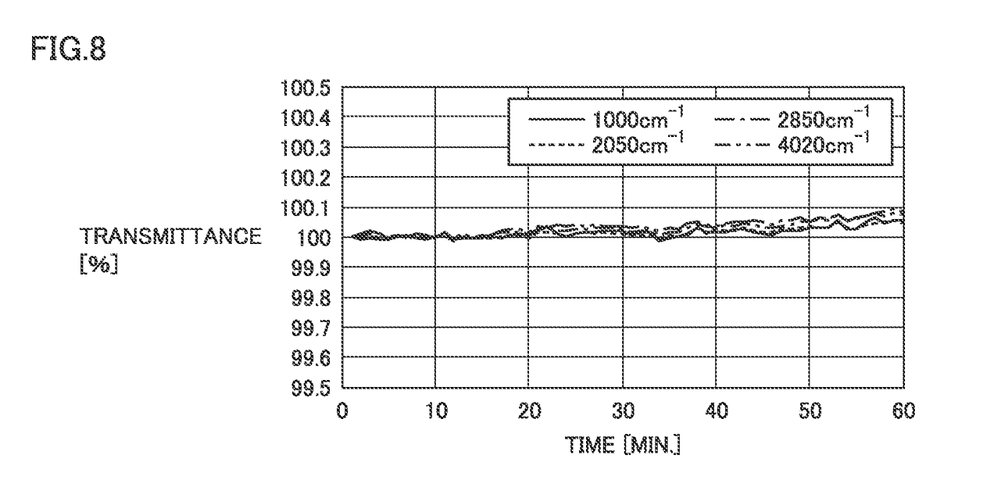
FIG. 8 shows temporal changes in a background power spectrum measured with the Fourier transform infrared spectrophotometer of an example.
Figure 11:
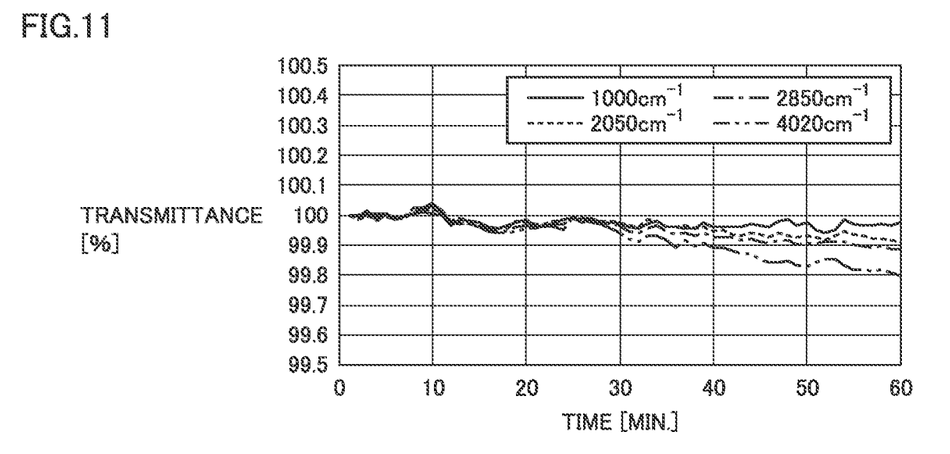
FIG. 11 shows temporal changes in a background power spectrum measured with the Fourier transform infrared spectrophotometer of the comparative example.

FIG. 8 is a graph showing temporal changes in a background power spectrum obtained with Fourier transform infrared spectrophotometer 1 of the example. FIG. 11 is a graph showing temporal changes in a background power spectrum obtained with Fourier transform infrared spectrophotometer 1 of the comparative example. The horizontal axis of each of these graphs indicates a time from start of measurement, and the vertical axis of each of these graphs indicates a transmittance of a background. In each of these graphs, the solid line indicates temporal changes in a transmittance of a background relative to an infrared light beam with a wave number of 1000 cm$^{-1}$. The dotted line indicates temporal changes in a transmittance of a background relative to an infrared light beam with a wave number of 2050 cm$^{-1}$. The single-dot chain line indicates temporal changes in a transmittance of a background relative to an infrared light beam with a wave number of 2850 cm$^{-1}$. The double-dot chain line indicates temporal changes in a transmittance of a background relative to an infrared light beam with a wave number of 4020 cm$^{-1}$.

The comparison between FIGS. 8 and 11 reveals that temporal changes in background power spectrum are reduced more in Fourier transform infrared spectrophotometer 1 of the example than in the Fourier transform infrared spectrophotometer of the comparative example. The background power spectrum means a power spectrum obtained with the Fourier transform infrared spectrophotometer when sample 3 is not disposed in sample chamber 4. In this manner, it is conceivable that temporal changes in the background power spectrum obtained by Fourier transform infrared spectrophotometer 1 of the present embodiment are smaller than temporal changes in the background power spectrum obtained by the Fourier transform infrared spectrophotometer of the comparative example for the following reason.

In the present embodiment and the comparative example, support member 70 is irradiated with infrared light beam 11. Waveplate 27 is irradiated with infrared light beam 11 and control light beam 21. Infrared light beam 11 and control light beam 21 act as heat sources of support member 70 and waveplate 27. While infrared light source 10 is radiating infrared light beam 11, heat is generated in infrared light source 10. While control light source 20 is radiating control light beam 21, heat is generated in control light source 20. The heat generated in infrared light source 10 and the heat generated in control light source 20 are transferred to support member 70 via housing 8.

In the comparative example, the entire outer perimeter of waveplate 27 is restrained by support member 70 (frame 76). The coefficient of thermal expansion of support member 70 is different from the coefficient of thermal expansion of waveplate 27. Waveplate 27 is softer than support member 70. Thus, the thermal stress due to the difference between the coefficient of thermal expansion of support member 70 and the coefficient of thermal expansion of waveplate 27 is likely to be applied to waveplate 27. A thermal stress occurs in the region of waveplate 27, through which first control light beam 21j passes.

Support member 70 has a thermal conductivity higher than the thermal conductivity of waveplate 27. Support member 70 is attached to housing 8 having a larger volume. The heat transferred to support member 70 is diffused to housing 8, and accordingly, the temperature of support member 70 is less likely to rise than that of waveplate 27. In the comparative example, the entire outer perimeter of waveplate 27 is restrained by support member 70 (frame 76). This increases the difference between the temperature of the peripheral edge of waveplate 27 proximate to support member 70 (frame 76) and the temperature of the central portion of waveplate 27 distal to support member 70 (frame 76). A thermal stress occurs in the region of waveplate 27, through which first control light beam 21j passes, due to the non-uniform temperature distribution in waveplate 27.

Such a thermal stress leads to variations in the physical thickness and the refractive-index distribution of the region of waveplate 27 through which control light beam 21 (first control light beam 21j) passes. The variations in the physical thickness and the refractive-index distribution of waveplate 27 distort the wave surface of control light beam 21 (first control light beam 21j) that has passed through waveplate 27. The distortions of the wave surface of control light beam 21 disturb the phase of the output signal of first control light detector 35 (photodetector elements 35a, 35b, 35c, 35d) and the phase of the output signal of second control light detector 36. This causes errors in the speed of moving mirror 15 and the orientation of fixed mirror 14 or moving mirror 15, which are determined based on an output signal from control light detector 34. As a result, the speed of moving mirror 15 and the orientation of fixed mirror 14 or moving mirror 15 cannot be set accurately, and the position of moving mirror 15 cannot be detected accurately. A stable interferogram with smaller temporal changes cannot be obtained. A stable power spectrum with smaller temporal changes cannot be obtained.

Contrastingly, in the present embodiment, the released region of the outer perimeter of waveplate 27 is spaced apart from support member 70. This reduces thermal conduction between waveplate 27 and support member 70. The thermal stress reduces that is applied to the region of waveplate 27, through which control light beam 21 (first control light beam 21j) passes, due to the difference between the coefficient of thermal expansion of support member 70 and the coefficient of thermal expansion of waveplate 27. The difference between the temperature of the peripheral edge of waveplate 27 proximate to support member 70 (frame 76) and the temperature of the central portion of waveplate 27 distant from support member 70 (frame 76) reduces. The thermal stress caused in the region of waveplate 2, through which control light beam 21 (first control light beam 21j) passes, due to the nonuniform temperature distribution in waveplate 27 also reduces.

Thus, variations in the physical thickness and the refractive-index distribution of the region of waveplate 27, through which control light beam 21 (first control light beam 21j) passes, are reduced. The distortions of the wave surface of control light beam 21 (first control light beam 21j) that has passed through waveplate 27 are reduced. Based on an output signal from control light detector 34, the speed of moving mirror 15 and the orientation of fixed mirror 14 or moving mirror 15 can be set more accurately, and the position of moving mirror 15 can be detected more accurately. As a result, a stable interferogram with smaller temporal changes can be obtained. A stable power spectrum with smaller temporal changes can be obtained.

[Aspects]

It will be appreciated by a person skilled in the art that the exemplary embodiment described above provides specific examples of the following aspects.

(Clause 1) A Fourier transform infrared spectrophotometer of an aspect includes a main interferometer, a control interferometer, an infrared detector, a control light detector, a waveplate, and a support member. The main interferometer includes an infrared light source that emits an infrared light beam, a beam splitter, a fixed mirror, and a moving mirror. The control interferometer includes a control light source that emits a control light beam, the beam splitter, the fixed mirror, and the moving mirror. The infrared detector detects an infrared interference light beam that is generated by the main interferometer and passes through a sample or is reflected by the sample. The control light detector detects a control interference light beam generated by the control interferometer. The waveplate is disposed on an optical path of the control light beam and between the fixed mirror or the moving mirror and the beam splitter. The support member supports the waveplate. An outer perimeter of the waveplate includes a supported region supported by the support member, and a released region spaced apart from the support member.

Thus, thermal conduction between the waveplate and the support member reduces. The thermal stress reduces that is applied to the region of the waveplate, through which the control light beam passes, due to the difference between the coefficient of thermal expansion of the support member and the coefficient of thermal expansion of the waveplate. Also, the difference between the temperature of the peripheral edge of the waveplate proximate to the support member and the temperature of the central portion of the waveplate distant from the support member is reduced. The thermal stress also reduces that is applied to the region of the waveplate, through which the control light beam passes, due to the nonuniform temperature distribution in the waveplate. Thus, variations in the physical thickness and the refractive-index distribution of the region of the waveplate, through which the control light beam passes, are reduced. Based on an output signal from the control light detector, the speed of the moving mirror and the orientation of the fixed mirror or the moving mirror can be set more accurately, and the position of the moving mirror can be detected more accurately. Consequently, a stable interferogram with smaller temporal changes can be obtained. A stable power spectrum with smaller temporal changes can be obtained.

(Clause 2) In the Fourier transform infrared spectrophotometer according to clause 1, the released region of the outer perimeter of the waveplate is not less than a third of a length of the outer perimeter of the waveplate.

Thus, variations in the physical thickness and the refractive-index distribution of the region of the waveplate, through which the control light beam passes, are reduced. A stable interferogram with smaller temporal changes can be obtained. A stable power spectrum with smaller temporal changes can be obtained.

(Clause 3) In the Fourier transform infrared spectrophotometer according to clause 2, the support member supports only one side of the outer perimeter of the waveplate.

Thus, variations in the physical thickness and the refractive-index distribution of the region of the waveplate, through which the control light beam passes, are reduced. A stable interferogram with smaller temporal changes can be obtained. A stable power spectrum with smaller temporal changes can be obtained.

(Clause 4) The Fourier transform infrared spectrophotometer according to any one of clauses 1 to 3 further includes a fixing member that attaches the waveplate to the support member. The support member has a slit. The waveplate is inserted into the slit. The fixing member includes an elastic spacer. The elastic spacer is inserted into the slit and is disposed between the support member and the waveplate.

The elastic spacer allows the waveplate to be attached to the support member without local application of a high mechanical stress to the waveplate. Thus, variations in the physical thickness and the refractive-index distribution of the region of the waveplate, through which the control light beam passes, are reduced. A stable interferogram with smaller temporal changes can be obtained. A stable power spectrum with smaller temporal changes can be obtained.

(Clause 5) In the Fourier transform infrared spectrophotometer according to clause 4, a first thermal conductivity of the elastic spacer is not greater than 30% of a second thermal conductivity of the waveplate.

Thus, the elastic spacer reduces thermal conduction between the waveplate and the support member. Variations in the physical thickness and the refractive-index distribution of the region of the waveplate, through which the control light beam passes, are reduced. A stable interferogram with smaller temporal changes can be obtained. A stable power spectrum with smaller temporal changes can be obtained.

(Clause 6) In the Fourier transform infrared spectrophotometer according to clause 4 or 5, the fixing member further includes a plate that is in contact with the elastic spacer, and a pressing member that presses the plate toward the elastic spacer and the waveplate.

Thus, the waveplate can be pressed more uniformly. Local application of a high mechanical stress to the waveplate can be prevented. Thus, variations in the physical thickness and the refractive-index distribution of the region of the waveplate, through which the control light beam passes, are reduced. A stable interferogram with smaller temporal changes can be obtained. A stable power spectrum with smaller temporal changes can be obtained.

(Clause 7) The Fourier transform infrared spectrophotometer according to any one of clauses 1 to 6 further incudes a housing. The support member includes a mount to which the waveplate is mounted, and a pillar. The pillar is connected to the mount and is attached to the housing. In a plan view from an optical axis direction of the infrared light beam, the pillar has a width smaller than that of the mount.

Thus, an infrared light beam blocked by the support member reduces. The intensity of the infrared interference light beam increases. A rise in the temperature of the pillar can be suppressed. Based on an output signal from the control light detector, the speed of the moving mirror and the orientation of the fixed mirror or the moving mirror can be set more accurately, and the position of the moving mirror can be detected more accurately. Consequently, a stable interferogram with smaller temporal changes can be obtained. A stable power spectrum with smaller temporal changes can be obtained.

An amount of the infrared light beam that is radiated to the support member is reduced. A rise in the temperature of the support member is reduced. Variations in the physical thickness and the refractive-index distribution of the region of the waveplate, through which the control light beam passes, are reduced. A stable interferogram with smaller temporal changes can be obtained. A stable power spectrum with smaller temporal changes can be obtained.

(Clause 8) The Fourier transform infrared spectrophotometer according to any one of clauses 1 to 6 further includes a housing. The support member includes a pillar to which the waveplate is attached. The pillar has a width smaller than that of the waveplate and is attached to the housing.

Accordingly, the infrared light beam blocked by the support member reduces. The intensity of the infrared interference light beam increases. A rise in the temperature of the pillar can be suppressed. Based on an output signal from the control light detector, the speed of the moving mirror and the orientation of the fixed mirror or the moving mirror can be set more accurately, and the position of the moving mirror can be detected more accurately. Consequently, a stable interferogram with smaller temporal changes can be obtained. A stable power spectrum with smaller temporal changes can be obtained.

An amount of the infrared light beam radiated to the support member is reduced. A rise in the temperature of the support member is reduced. Variations in the physical thickness and the refractive-index distribution of the region of the waveplate, through which the control light beam passes, are reduced. A stable interferogram with smaller temporal changes can be obtained. A stable power spectrum with smaller temporal changes can be obtained.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A Fourier transform infrared spectrophotometer comprising:
a main interferometer including an infrared light source that emits an infrared light beam, a beam splitter, a fixed mirror, and a moving mirror;
a control interferometer including a control light source that emits a control light beam, the beam splitter, the fixed mirror, and the moving mirror;
an infrared detector that detects an infrared interference light beam that is generated by the main interferometer and passes through a sample or is reflected by the sample;
a control light detector that detects a control interference light beam generated by the control interferometer;
a waveplate disposed on an optical path of the control light beam and between the fixed mirror or the moving mirror and the beam splitter; and
a support member that supports the waveplate,
wherein an outer perimeter of the waveplate includes
a supported region supported by the support member, and
a released region spaced apart from the support member.

2. The Fourier transform infrared spectrophotometer according to claim 1, wherein the released region of the outer perimeter of the waveplate is not less than a third of a length of the outer perimeter of the waveplate.

3. The Fourier transform infrared spectrophotometer according to claim 1, wherein the support member supports only one side of the outer perimeter of the waveplate.

4. The Fourier transform infrared spectrophotometer according to claim 1, further comprising a fixing member that attaches the waveplate to the support member, wherein
the support member has a slit,
the waveplate is inserted into the slit,
the fixing member includes an elastic spacer, and
the elastic spacer is inserted into the slit and is disposed between the support member and the waveplate.

5. The Fourier transform infrared spectrophotometer according to claim 4, wherein a first thermal conductivity of the elastic spacer is not greater than 30% of a second thermal conductivity of the waveplate.

6. The Fourier transform infrared spectrophotometer according to claim 4, wherein the fixing member further includes
a plate that is in contact with the elastic spacer, and
a pressing member that presses the plate toward the elastic spacer and the waveplate.

7. The Fourier transform infrared spectrophotometer according to claim 1, further comprising a housing, wherein
the support member includes
a mount to which the waveplate is mounted, and
a pillar,
the pillar is connected to the mount and is attached to the housing, and
in a plan view from an optical axis direction of the infrared light beam, the pillar has a width smaller than that of the mount.

8. The Fourier transform infrared spectrophotometer according to claim 1, further comprising a housing, wherein
the support member includes a pillar to which the waveplate is attached, and
the pillar has a width smaller than that of the waveplate and is attached to the housing.

\* \* \* \* \*